US008131273B2

(12) United States Patent
Lee et al.

(10) Patent No.: US 8,131,273 B2
(45) Date of Patent: Mar. 6, 2012

(54) METHOD FOR TRANSMITTING AND RECEIVING A MBMS SERVICE IN MOBILE COMMUNICATION SYSTEM

(75) Inventors: Young-Dae Lee, Gyeonggi-Do (KR); Sung-Duck Chun, Gyeonggi-Do (KR); Myung-Cheul Jung, Seoul (KR); Sung-Jun Park, Gyeonggi-Do (KR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 935 days.

(21) Appl. No.: 12/064,606

(22) PCT Filed: Aug. 22, 2006

(86) PCT No.: PCT/KR2006/003289
§ 371 (c)(1),
(2), (4) Date: Feb. 22, 2008

(87) PCT Pub. No.: WO2007/024082
PCT Pub. Date: Mar. 1, 2007

(65) Prior Publication Data
US 2008/0311892 A1    Dec. 18, 2008

(30) Foreign Application Priority Data
Aug. 23, 2005   (KR) .................. 10-2005-0077551

(51) Int. Cl.
*H04M 3/42* (2006.01)
(52) U.S. Cl. ............. 455/414.1; 455/432.38; 455/466; 455/518; 455/519; 709/48; 709/229; 709/249

(58) Field of Classification Search ............... 455/414.1, 455/432.3, 466; 709/48, 229, 249
See application file for complete search history.

(56) References Cited

U.S. PATENT DOCUMENTS

| 6,374,112 | B1 | 4/2002 | Widegren et al. |
| 6,901,060 | B1 * | 5/2005 | Lintulampi ................ 370/329 |
| 6,925,298 | B2 | 8/2005 | Ho |
| 6,968,200 | B2 | 11/2005 | Kuo |
| 7,123,630 | B1 * | 10/2006 | Ueno ............................ 370/517 |
| 2003/0108047 | A1 * | 6/2003 | Mackiewich et al. ...... 370/395.1 |
| 2004/0103435 | A1 * | 5/2004 | Yi et al. .......................... 725/81 |

(Continued)

FOREIGN PATENT DOCUMENTS
EP           1509056           12/2005
(Continued)

OTHER PUBLICATIONS

Chang Quian et al.: "Study of QoS in UTRAN", Electrical and Computer Engineering, 2002. IEEE CCECE 2002. Canadian Conference, May 2002.

*Primary Examiner* — Kamran Afshar
*Assistant Examiner* — Edward Zhang
(74) *Attorney, Agent, or Firm* — Lee, Hong, Degerman, Kang & Waimey

(57) ABSTRACT

A method for transmitting and receiving a Multimedia Broadcast/Multicast Service in a mobile communication system. The mobile communication system transmits the same service in different streams by having first bearer information and a second bearer information for the same service. The mobile terminal effectively receives the MBMS service by receiving second bearer information based on the first bearer information received through a downlink control channel.

20 Claims, 2 Drawing Sheets

U.S. PATENT DOCUMENTS

| | | | |
|---|---|---|---|
| 2004/0156329 A1* | 8/2004 | Bck et al. | 370/328 |
| 2005/0007990 A1* | 1/2005 | Beckmann et al. | 370/349 |
| 2005/0036492 A1* | 2/2005 | Hoffmann et al. | 370/395.2 |
| 2005/0085255 A1* | 4/2005 | Andersson et al. | 455/522 |
| 2005/0101351 A1 | 5/2005 | Lee et al. | |
| 2005/0111395 A1* | 5/2005 | Hwang et al. | 370/313 |
| 2005/0118992 A1* | 6/2005 | Jeong et al. | 455/422.1 |
| 2005/0169205 A1* | 8/2005 | Grilli et al. | 370/313 |
| 2005/0174956 A1* | 8/2005 | Yi et al. | 370/312 |
| 2006/0019641 A1* | 1/2006 | Vayanos et al. | 455/414.1 |
| 2006/0019671 A1* | 1/2006 | Chemiakina et al. | 455/452.2 |
| 2006/0030342 A1* | 2/2006 | Hwang et al. | 455/466 |
| 2006/0183471 A1* | 8/2006 | Samuel et al. | 455/423 |
| 2006/0198336 A1* | 9/2006 | Major et al. | 370/328 |
| 2007/0105557 A1* | 5/2007 | Israelsson et al. | 455/436 |
| 2008/0293428 A1* | 11/2008 | Rey et al. | 455/452.2 |

FOREIGN PATENT DOCUMENTS

| | | |
|---|---|---|
| JP | 2002-511672 | 4/2002 |
| RU | 2259016 | 8/2005 |
| WO | 2005018098 | 2/2005 |
| WO | 2005/039114 | 4/2005 |
| WO | 2005067194 | 7/2005 |

\* cited by examiner

METHOD FOR TRANSMITTING AND RECEIVING A MBMS SERVICE IN MOBILE COMMUNICATION SYSTEM

CROSS-REFERENCE TO RELATED APPLICATIONS

This application is a national stage application of International Application No. PCT/KR2006/003289, filed on Aug. 22, 2006, which claims the benefit of earlier filing date and right of priority to Korean Application No. 10-2005-0077551, filed on Aug. 23, 2005, the contents of all of which are hereby incorporated by reference herein in their entirety.

TECHNICAL FIELD

The present invention relates to a multimedia broadcast/multicast service (MBMS) and, more particularly, to transmitting and receiving data and control information for an MBMS.

BACKGROUND ART

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

A UMTS network structure 1 is illustrated in FIG. 1. As shown, a mobile terminal, or user equipment (UE) 2 is connected to a core network (CN) 4 through a UMTS terrestrial radio access network (UTRAN) 6. The UTRAN 6 configures, maintains and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for plurality base stations, or Node Bs 12. The RNC 10 connected to a given base station 12 is the controlling RNC for allocating and managing the common resources provided for any number of UEs 2 operating in one cell. One or more cells exist in one Node B. The controlling RNC 10 controls traffic load, cell congestion, and the acceptance of new radio links. Each Node B 12 may receive an uplink signal from a UE 2 and may transmit a downlink signals to the UE 2. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example 3GPP specifications. These layers are based on the lower three layers of an open system interconnection (OSI) model that is a well-known in communications systems.

An architecture of the radio interface protocol is illustrated in FIG. 2. As shown, the radio interface protocol is divided horizontally into the physical layer, the data link layer, and the network layer, and is divided vertically into a user plane for carrying data traffic such as voice signals and Internet protocol packet transmissions and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. Also, data transmission is performed through a physical channel between different physical layers, namely, between physical layers of a sending side (transmitter) and a receiving side (transmitter).

The MAC layer of the second layer (L2) provides information transfer service to a higher layer and is linked via a logical channel to a radio link control (RLC) layer. The RLC layer of the second layer (L2) supports the transmission of reliable data and can perform segmentation and concatenation functions for RLC service data units (SDU) received from an upper layer.

The radio resource control (RRC) layer located at the lowest portion of the third layer (L3) is only defined in the control plane and controls transport channels and physical channels with respect to the establishment, re-establishment, and release of radio bearers. A radio bearer (RB) is a service provided by a lower layer, such as the RLC layer or the MAC layer, for transferring data between the UE 2 and the UTRAN 6.

The establishment of an RB determines regulating characteristics of the protocol layer and channel needed to provide a specific service, thereby establishing the parameters and operational methods of the service. When a connection is established to allow transmission between an RRC layer of a specific UE 2 and an RRC layer of the UTRAN 6, the UE 2 is said to be in the RRC-connected state. Without such connection, the UE 2 is in an idle state.

Hereafter, a Multimedia Broadcast/Multicast Service (MBMS or "MBMS service") will be described. MBMS refers to a method of providing streaming or background services to a plurality of UEs 2 using a downlink-dedicated MBMS radio bearer that utilizes at least one of a point-to-multipoint radio bearer and a point-to-point radio bearer. One MBMS service includes one or more sessions and MBMS data is transmitted to the plurality of terminals (i.e. UEs) through the MBMS radio bearer only while the session is ongoing.

A MBMS may be carried out in a broadcast mode or a multicast mode. The broadcast mode is for transmitting multimedia data to all UEs 2 within a broadcast area, for example the region where the broadcast is available. The multicast mode is for transmitting multimedia data to a specific UE 2 group within a multicast area, for example the region where the multicast service is available.

The UTRAN 6 provides the MBMS service to the UEs 2 using the RB. RBs used by the UTRAN 6 can be classified as a point-to-point RB or a point-to-multipoint RB. The point-to-point RB is a bi-directional RB, including a logical channel DTCH (Dedicated Traffic Channel), a transport channel DCH (Dedicated Channel) and a physical channel DPCH (Dedicated Physical Channel) or SCCPCH (Secondary Common Control Physical Channel).

The point-to-multipoint RB is a uni-directional downlink RB, including a logical channel MTCH (MBMS Traffic Channel), a transport channel FACH (Forward Access Channel), and the physical channel SCCPCH, as shown in FIG. 3. The logical channel MTCH is configured for each MBMS service provided to one cell and used to transmit user plane data of a specific MBMS service to multiple UEs.

FIG. 3 is a diagram for explaining channel mapping for MBMS. Referring to FIG. 3, a point-to-multipoint radio bearer includes a logical channel MTCH (MBMS traffic channel), a transport channel FACH (forward access channel) and a physical channel SCCPCH. The logical channel MTCH is configured for each MBMS offered by one cell and is used in transmitting user-plane data of a MBMS to a plurality of UEs.

A logical channel MCCH (MBMS control channel), as shown in FIG. 3, is a point-to-multipoint downlink channel and is used in transmitting control information associated with the MBMS. The logical channel MCCH is mapped to the transport channel FACH (forward access channel), while the transport channel FACH is mapped to the physical channel SCCPCH (secondary common control physical channel). One cell has one MCCH.

FIG. 4 is a conceptual view illustrating a transmission method of the MCCH information. The MCCH information is periodically transmitted according to a modification period and a repetition period. The MCCH information is divided into critical information and non-critical information. Among the critical information and non-critical information, the non-critical information may be modified at a modification period or a repetition period. However, the modification of the critical information may be made only at a modification period. Therefore, the critical information is repeated once during each repetition period in order to be transmitted. However, the transmission of the modified critical information may only occur at a start point of a modification period.

The MCCH information includes one or more control messages (i.e., RRC message, MBMS Modified Services Information (MSI), MBMS Unmodified Services Information (USI), MBMS point-to-multipoint radio bearer information and access information, etc) of the MBMS. Among these messages, the access information is considered as non-critical information, and any other MCCH information messages are considered as critical information.

The access information is used to operate a counting process. Based on the access information, the UE executes a RRC connection process, cell update process, or URA update process by transmitting a counting process response message, such like a RRC connection request message, cell update message, or URA update message.

As the UTRAN transmits all the messages, a message is sent with a MBMS transmission identity if that message has information about a particular service. Here, the MBMS transmission identity is formed with a MBMS Session Identity and a MBMS Service Identity. For example, when the MSI needs to be transmitted, the MSI contains the MBMS Session Identity together with service information which is represented by the MBMS Service Identity.

The UTRAN periodically transmits a physical channel MICH (MBMS notification indicator channel) to indicate whether the MCCH information was updated during the modification period. Therefore, a UE attempting to receive only a certain MBMS does not receive the MCCH or MTCH until a session of the certain MBMS service begins. However, the UE does receive a MICH (MBMS notification indicator channel) periodically. An update of the MCCH information is referring to the generation, addition, modification and/or removal of a specific item of the MCCH information.

Also, the UTRAN periodically transmits the MSI message with the physical channel MICH to indicate whether the MCCH information was updated. The MSI message contains identity information of all service(s) which were updated in a current cell during the modification period and required operating information for a service subscribed UE. Here, the MBMS Transmission Identity is used for the identity information. The MBMS Transmission Identity is consisted of a MBMS service identity which indicates a specific service or the MBMS Transmission Identity is consisted of a MBMS service identity with the MBMS Session Identity which indicates a specific session of specific service. From current services provided in the cell, the identity information of the unmodified service during the modification period is transmitted via a USI message. In this case, the MBMS Transmission Identity is used for the identity information of such service.

Once a session of a specific MBMS begins, the UTRAN transmits an NI (notification indicator). The NI is an indicator that provides notification to receive an MCCH to a UE attempting to receive a specific MBMS. Upon receiving the NI via the MICH, the UE receives an MCCH during a specific modification period indicated by the MICH. During a reception of the MCCH, the UE initially receives the MSI message to determine whether the MBMS service desired by the UE during the modification period, is updated or not, then receives a modified MCCH information if an update exists. The UE can find out all service lists provided from the current cell by receiving a transmitted MSI message and USI message within the modification period.

Therefore, the UE wanting to receive the specific MBMS using the point-to-multipoint RB, receives the MCCH information including the RB information via the MCCH, and establishes the point-to-multipoint RB using the MCCH information. After establishing the point-to-multipoint RB, the UE continuously receives the physical channel SCCPCH, to which the MTCH is mapped, to obtain data of the specific MBMS transmitted via the MTCH.

The UTRAN can transmit MBMS data discontinuously via the MTCH. In this case, as illustrated in FIG. 3, the UTRAN periodically transmits a scheduling message to the UE through a MBMS Scheduling Channel (MSCH) of SSCPCH which the MTCH is mapped. The scheduling message notifies a transmission start time point and a transmission duration for the MBMS data which is transmitted during one scheduling period. In order to perform this, the UTRAN has to inform a transmission period of scheduling information to the UE in advance.

DISCLOSURE OF INVENTION

Technical Problem

As described in above, in the related art, the UE receives service data after receiving service information of a bearer service. Therefore, if multiple bearer service data in one user service needs to be received, the UE performs the steps of receiving each bearer service data respectively after receiving service information of the each bearer services independently.

Therefore, the UE has to receive service information of the multiple bearer service independently when the UE receives a user service. This is problematic because the UE ineffectively receives the service information of the multiple bearer service. Therefore, what is needed is a method for transmitting and receiving a MBMS service in mobile communication system in a more effective manner.

Technical Solution

Therefore, the present invention provides a method for transmitting an MBMS service in order to receive the MBMS service by the UE effectively.

To achieve this, the present invention provides a method for receiving a multimedia service in a mobile communications system, the method comprising: receiving control information of a first bearer through a downlink control channel; receiving control information of a second bearer through the downlink control channel based on the received control information of the first bearer; and receiving data of the second bearer through a downlink data channel using the received control information of the second bearer.

The downlink control channel may be at least one of a MBMS Control Channel (MCCH) and a MBMS notification Indicator Channel (MICH).

The downlink data channel may be at least one of a MBMS Traffic Channel (MTCH) and a Dedicated Traffic Channel (DTCH).

The first bearer and the second bearer respectively may have a different Quality of Service (QoS).

The multimedia service May be a Multimedia Broadcast/Multicast Service (MBMS) service.

BRIEF DESCRIPTION OF THE DRAWINGS

The invention will be described with reference to the drawings, in which.

MODE FOR THE INVENTION

One aspect of the present invention relates to the recognition by the present inventors about the problems of the related art as described above, and further explained hereafter. Based upon this recognition, the features of the present invention have been developed.

The present invention relates to a method for transmitting and receiving data and control information for an MBMS more effectively. For this purpose, the present invention may provide a mobile communication system having first bearer and a second bearer for the same service transmits a different streaming of same service using the first bearer and second bearer respectively. The UE (i.e., mobile terminal) may receive the MBMS service effectively by receiving the second bearer based on the first bearer received through a downlink control channel.

The first bearer and the second bearer may provide the same service where each bearer respectively has a different Quality of Service (QoS). Also, the first bearer and the second bearer may transmit/receive a streaming of service through different common physical channels using different channel codes. Here, data of the first bearer and the second bearer may be combined together upon receiving by the UE.

The service may be a Multimedia Broadcast/Multicast Service (MBMS) service, and the first bearer and/or the second bearer may be a MBMS bearer service.

The first bearer and/or the second bearer may use a point-to-point Dedicated Traffic Channel (DTCH) or a point-to-multipoint MBMS Traffic Channel (MTCH).

The downlink control channel may be at least one of a MBMS Control Channel (MCCH) and a MBMS notification Indicator Channel (MICH).

Although the present invention is shown to be implemented in a mobile communication system, such as a UMTS developed under 3GPP specifications, the present invention can also be applied to a communication system operating in conformity with different standards and specifications.

Figure 1:
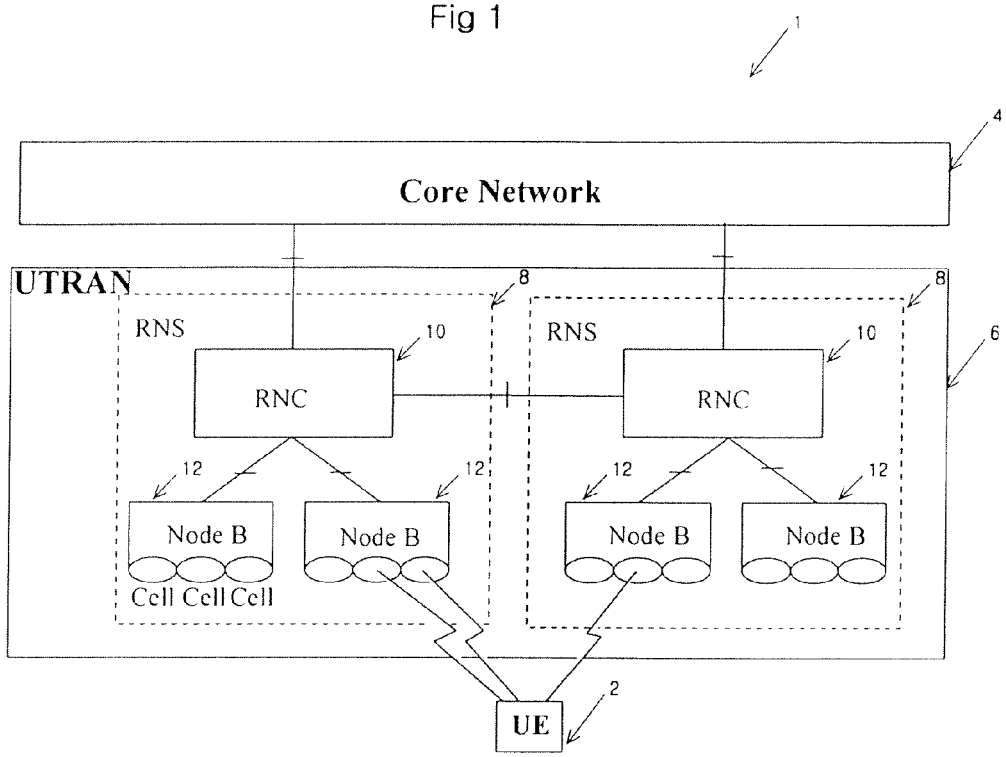
FIG. 1 illustrates an exemplary block diagram of a general UMTS network architecture.
Figure 2:
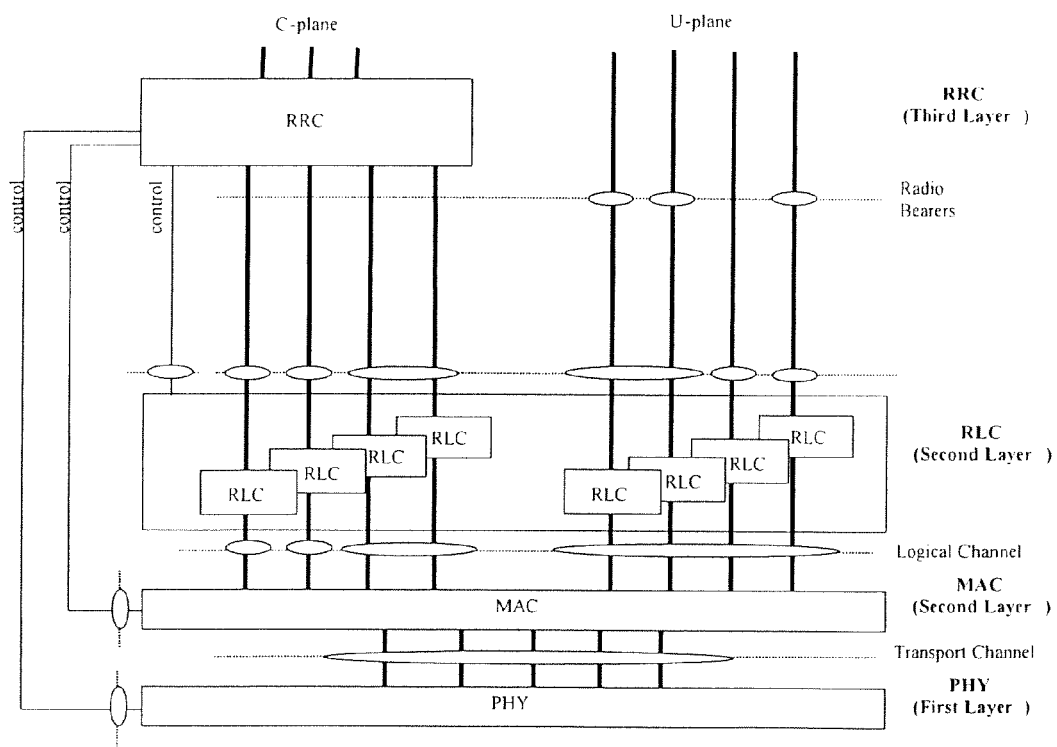
FIG. 2 illustrates an exemplary radio interface protocol architecture based on a radio access network specification between the UE and the UTRAN.
Figure 3:
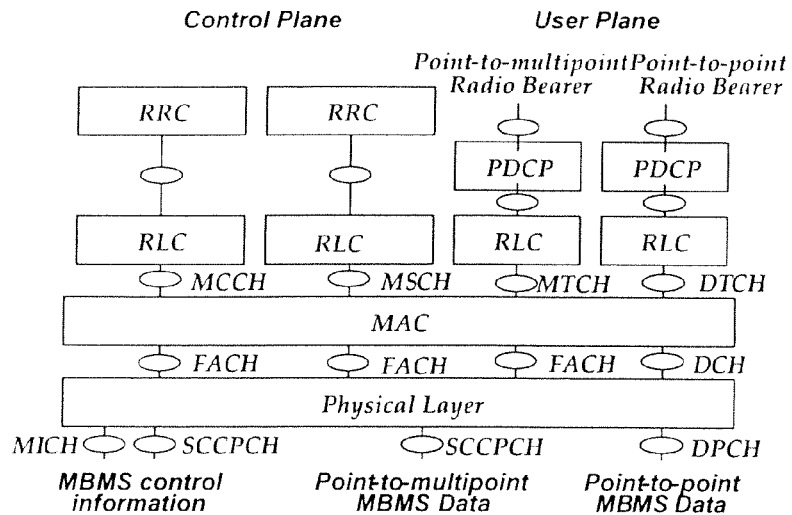
FIG. 3 illustrates an exemplary channel mapping for MBMS service for an UE.
Figure 4:
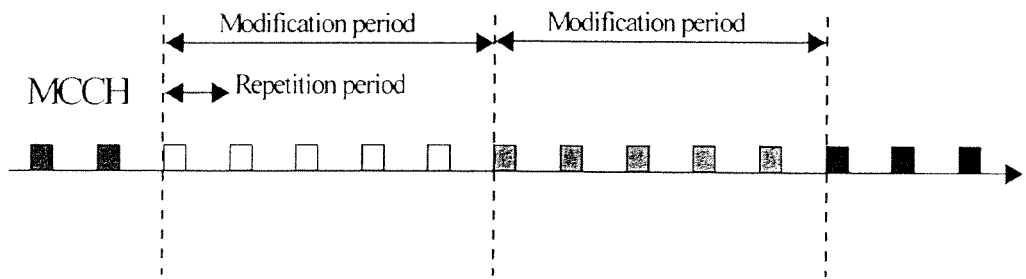
FIG. 4 illustrates an exemplary diagram for explaining a transmission method of MCCH information.
Figure 5:
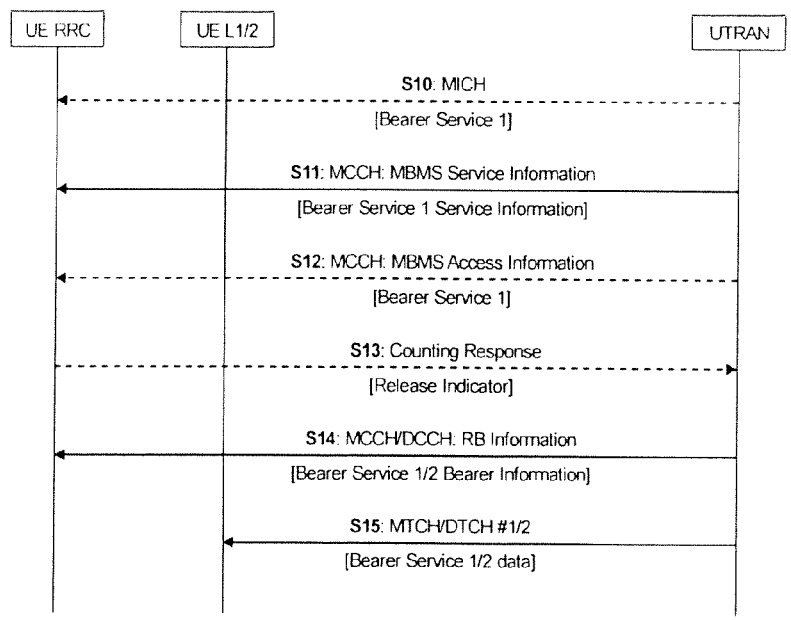
FIG. 5 illustrates an exemplary diagram for transmitting and receiving control information for an MBMS service in accordance with one embodiment of the invention.

In accordance with one exemplary embodiment of the invention, a method for transmitting and receiving control information for an MBMS service is illustrated in FIG. 5.

In FIG. 5, it may be assumed that the UE already knows a relationship of a plurality of bearer services such as, a bearer service 1 and bearer service, 2 for a single user service. The network may notify the UE that the bearer service 1 and the bearer service 2 are an inter-connected service. For example, the network may inform to the UE that the bearer service 1 is for a UE supporting a 3GPP standard of Release 6 or above (refer to as Release 6 UE hereinafter) and the bearer service 2 is for a terminal supporting a 3GPP standard of Release 7 or above (refer to as Release 7 UE hereinafter). Here, the UE may be in an active state for both the bearer service 1 and the bearer service 2, or the UE may be in an active state for the bearer service 2 only.

First, the UTRAN may transmit bearer service 1 information to the UE through a MBMS notification Indicator Channel (MICH). (S10) The UE may attempt to receive service information via the MCCH upon identifying the Notification Indicator (NI) of the bearer service 1 through the MICH.

The UTRAN may transmit service information of the bearer service 1 through a MBMS Modified Service Information (MSI) message on the MCCH. (S11) Also, the UTRAN may transmit service information of the bearer service 2 through the MBMS MSI message or the MBMS Unmodified Service Information (USI) message. Therefore, the UE may receive the service information of the bearer service 1 through the MSI message or receive the service information of the bearer service 2 through the MSI or USI message.

The UTRAN may transmit necessary information of a counting process for the bearer service 1 within an access information message if a counting process is required for the bearer service 1 or the bearer service 2. (S12) Namely, the UTRAN may transmit necessary information of the counting process for the bearer service 1 by receiving the access information message if the bearer service 1 or the bearer service 2 from the service information is required to perform the counting process. Here, the necessary information of the counting process may indicate a probability to transmit an access information response on a Random Access Channel (RACH). Namely, it may represent a Transmission Probability.

When only the bearer service 1 information exists within the access information message, the UTRAN may assign a different priority for the bearer service 1 and the bearer service 2. For example, different settings of a RACH access service class, a RACH signature, a RACH access slot, and a logical channel priority may be made for the UE that only receives the bearer service 1 or the UE that only receives the bearer service 2 only.

It is possible that the UTRAN may operate to include both the probability factors for the bearer service 1 and the bearer service 2 into the access information message. In this case, the UE may decide to make a response for the probability factor of which bearer service based upon the UEs capabilities (i.e., whether the UE supports Release 6 or 7). For example, the UE supporting Release 6 or above may transmit a counting response message by using the probability factor of the bearer service 1 and the UE supporting Release 7 or above may transmit a counting response message by using the probability factor of the bearer service 2.

When the counting process of the bearer service 1 or the bearer service 2 from the service information message is required, the UE may transmit the counting response message based upon the necessary information of the counting process for the received bearer service 1 (S13). Here, the counting response message may include a Release Indicator (RI) to represent the UEs Release number. In addition, if the counting response message is a RRC connection request message, the RI may be included in the RRC Connection Request Message or a RRC Connection Setup Complete Message. Also, the counting response message may be included in a cell update message or a URA update message.

After step S13, the UTRAN may determine whether to use a point-to-point radio bearer or a point-to-multipoint radio bearer for the bearer service 1 and the bearer service 2, and then may transmit radio bearer information to the UE in order to set (or install) the Radio Bearer. (S14) The UTRAN may provide the radio bearer information through the MCCH if the determined bearer is a point-to-multipoint radio bearer, and provide the radio bearer information through the DCCH if the determined bearer is a point-to-point radio bearer. Here, the UE may receive setting information of the radio bearer through the MCCH or DCCH. For the UE supporting Release 6, the UE may only set the radio bearer for bearer service 1, and for the UE supporting Release 7 or above, the UE may set the radio bearer for bearer service 2 or set the radio bearer for both bearer service 1 and bearer service 2. Furthermore, if the UTRAN determines not to provide the bearer service 2, the UE supporting Release 7 or above may only set the radio bearer for the bearer service 1.

Thereafter, the UTRAN may transmit data of the bearer service 1 and the bearer service 2 through the set radio bearer. (S15) Here, the bearer service 1 may be transmitted through the MTCH#1 or DTCH#1 depending upon the type of MBMS service [i.e. point-to-multipoint, point-to-point], while the bearer service 2 may be also transmitted through the MTCH#2 or DTCH#2. Also, the MTCH#1 may be mapped in the SCCPCH#1 and then transmitted, while the MTCH#2 may be mapped in the SCCPCH#2 and then transmitted. For Release 6, the UE may only receive data of the bearer service 1 through the MTCH or DTCH. For Release 7 or above, the UE may only receive data of the bearer service 2 or combine the data of the bearer service 1 and the bearer service 2 after receiving both bearer services. If the UTRAN decides not to provide the bearer service 2, the Release 7 UE may only receive data of the bearer service 1.

The feature of present invention may be implemented or applied to various situations. Usually, due to the particular characteristics of a UE (i.e., mobile terminal), various aspects, such as mobility, limited processor capabilities, restricted memory size, restrictions on battery power consumption, a relatively small-sized display screen, et., need to be considered when implementing the present invention with consideration of a balance of all these aspects mentioned above. Therefore, in present invention, the bearer service 1 and the bearer service 2 may be combined together based upon a capability of the UE. For example, if the bearer service 1 provides with relatively higher quality of service [i.e., 192 Kb sampling bits per second for an audio file] and the bearer service 2 provides with relatively lower quality of service [I.e., 64 Kb sampling bits per second for the audio file], intermediate quality of service [I.e., 128 Kb sampling bits per second for the audio file] may be use by combining the bearer service 1 and the bearer service 2 based upon the capability of the UE which only supports an audio files with up to 128 Kb sampling bit rate. Since the present invention allows to receive control and/or data information of the bearer service 2 based on control and/or data information of the bearer service 1, overall quality of service may be improved as well with consideration of the UEs capability. Here, the concept of combining of different quality services in the field of the MBMS service can be understood by those skilled in the art, and various other types of quality services [i.e., display attributes, audio attributes, video attributes, file attributes, etc] can be employed in the present invention.

It can be said that the present invention provides a method for receiving a multimedia service by a mobile terminal from a network, the method comprising: receiving control information of a first bearer through a downlink control channel; receiving control information of a second bearer through the downlink control channel based on the received control information of the first bearer; receiving data of the second bearer through a downlink data channel using the received control information of the second bearer, deciding to use the first bearer or the second bearer based upon a capability of the mobile terminal, attempting to receive system information via a MCCH when Notification Indicator (NI) information is identified by the mobile terminal through a MICH, and receiving access information for the first radio bearer information when a counting process is required for at least one of the first bearer and the second bearer, wherein the downlink control channel is at least one of a MBMS Control Channel (MCCH) and a MBMS notification Indicator Channel (MICH), the downlink data channel is at least one of a MBMS Traffic Channel (MTCH) and a Dedicated Traffic Channel (DTCH), the first bearer and the second bearer respectively have a different Quality of Service (QoS), the first bearer and the second bearer are received via different common physical channels using different channel codes, the first bearer and the second bearer are combined together upon reception, the control information of the first bearer is received by the mobile terminal through a Modified Services Information (MSI) in MCCH, the control information of the second bearer is received by the mobile terminal through a Modified Services Information (MSI) or Unmodified Services Information (USI) in MCCH, the access information response includes a Release Indicator (RI), the multimedia service is a point to multipoint service and/or a Multimedia Broadcast/Multicast Service (MBMS) service, the first bearer and the second bearer are used in the same point-to multipoint service, the first bearer and the second bearer are related to a MBMS bearer service, the first bearer and the second bearer are provided in one cell, and the access information includes a probability factor indicating a probability to transmit an access information response on a Random Access Channel (RACH).

Also, the present invention may provide a method for transmitting a Multimedia Broadcast/Multicast Service (MBMS) service from a network to a mobile terminal, the method comprising: sending control information of a first bearer through a downlink control channel; sending control information of a second bearer through the downlink control channel, wherein the control information of the second bearer is based on the control information of the first bearer, sending access information to the mobile terminal, wherein the access information comprises a counting process parameter for the first bearer, assigning a different priority for the first bearer and the second bearer based upon at least one of a RACH access service class, a RACH signature, a RACH access slot, and a logical channel priority, receiving a counting response, wherein the counting response include a release indicator, determining whether to use a point-to-point bearer or a point-to multipoint bearer for the first bearer and/or the second bearer, sending bearer setting information to the mobile terminal through a MBMS Control Channel (MCCH) if the point-to-multipoint bearer is determined, sending bearer setting information to the terminal through a Dedicated Control Channel (DCCH) if the point-to-point bearer is determined, sending data of the first bearer and the second bearer through at least one of a MBMS Traffic Channel (MTCH) and a Dedicated Traffic Channel (DTCH), wherein the downlink control channel is at least one of a MBMS Control Channel (MCCH) and a MBMS notification Indicator Channel (MICH), the control information of the first bearer is contained in a Modified Services Information (MSI) message in the MCCH and the control information of the second bearer is contained in at least one of the MSI message and Unmodified Services Information (USI) message in the MCCH, the counting process parameter is a probability factor indicating a probability to transmit an access information response on a Random Access Channel (RACH).

Although the present invention is described in the context of mobile communication, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EVDO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method for a mobile terminal receiving a multimedia service from a network, the method comprising:
   receiving control information of a first bearer through a downlink control channel;
   receiving control information of a second bearer through the downlink control channel based on the received control information of the first bearer;
   receiving bearer setting information from the network through a Multimedia Broadcast/Multicast Service (MBMS) Control Channel (MCCH) if the first bearer and the second bearer each comprises a point-to-multipoint bearer;
   receiving bearing setting information from the network through a Dedicated Control Channel (DCCH) if the first bearer and the second bearer each comprises a point-to-point bearer; and
   receiving data of the first bearer and data of the second bearer through at least an MBMS Traffic Channel (MTCH) or a Dedicated Traffic Channel (DTCH),
   wherein the first bearer and the second bearer have a Quality of Service (QoS) that is different from each other, and
   wherein the first bearer and the second bearer provide the same multimedia service.

2. The method of claim 1, wherein the downlink control channel is at least an MCCH or a MBMS notification Indicator Channel (MICH).

3. The method of claim 1, wherein the first bearer and the second bearer are received via different common physical channels using different channel codes.

4. The method of claim 1, further comprising combining the first bearer and the second bearer together upon reception.

5. The method of claim 1, further comprising: deciding to use the first bearer or the second bearer based upon a capability of the mobile terminal.

6. The method of claim 1, further comprising:
   attempting to receive system information via an MCCH when Notification Indicator (NI) information is identified by the mobile terminal through an MBMS notification Indicator Channel (MICH).

7. The method of claim 1, wherein the control information of the first bearer is received by the mobile terminal through a Modified Services Information (MSI) message in an MCCH.

8. The method of claim 1, wherein the control information of the second bearer is received by the mobile terminal through a Modified Services Information (MSI) message or an Unmodified Services Information (USI) message in an MCCH.

9. The method of claim 1, further comprising:
   receiving access information for first radio bearer information when a counting process is required for at least the first bearer or the second bearer, wherein the access information includes a probability factor indicating a probability to transmit an access information response on a Random Access Channel (RACH).

10. The method of claim 9, wherein the access information response includes a Release Indicator (RI).

11. The method of claim 1, wherein the multimedia service is a point to multipoint service.

12. The method of claim 1, wherein the multimedia service is an MBMS.

13. The method of claim 1, wherein the first bearer and the second bearer are related to an MBMS bearer service.

14. A method for transmitting a Multimedia Broadcast/Multicast Service (MBMS) service from a network to a mobile terminal, the method comprising:
- sending control information of a first bearer through a downlink control channel;
- sending control information of a second bearer through the downlink control channel, wherein the control information of the second bearer is based on the control information of the first bearer;
- determining whether to use a point-to-point bearer or a point-to-multipoint bearer for at least the first bearer or the second bearer;
- sending bearer setting information to the mobile terminal through a Multimedia Broadcast/Multicast Service (MBMS) Control Channel (MCCH) if it is determined that the point-to-multipoint bearer is used;
- sending bearing setting information to the mobile terminal through a Dedicated Control Channel (DCCH) if it is determined that the point-to-point bearer is used; and
- sending data of the first bearer and data of the second bearer through at least an MBMS Traffic Channel (MTCH) or a Dedicated Traffic Channel (DTCH),
- wherein the first bearer and the second bearer have a Quality of Service (QoS) that is different from each other, and wherein the first bearer and the second bearer provide the same MBMS service.

15. The method of claim 14, wherein the downlink control channel is at least an MCCH or an MBMS notification Indicator Channel (MICH).

16. The method of claim 15, wherein the control information of the first bearer is contained in a Modified Services Information (MSI) message in the MCCH and the control information of the second bearer is contained in at least the MSI message or an Unmodified Services Information (USI) message in the MCCH.

17. The method of claim 14, further comprising:
- sending access information to the mobile terminal, wherein the access information comprises a counting process parameter for the first bearer.

18. The method of claim 17, wherein the counting process parameter is a probability factor indicating a probability to transmit an access information response on a Random Access Channel (RACH).

19. The method of claim 18, further comprising:
- assigning a different priority for the first bearer and the second bearer based upon at least a RACH access service class, a RACH signature, a RACH access slot, or a logical channel priority.

20. The method of claim 18, further comprising:
- receiving a counting response, wherein the counting response includes a release indicator.

* * * * *